2,870,264

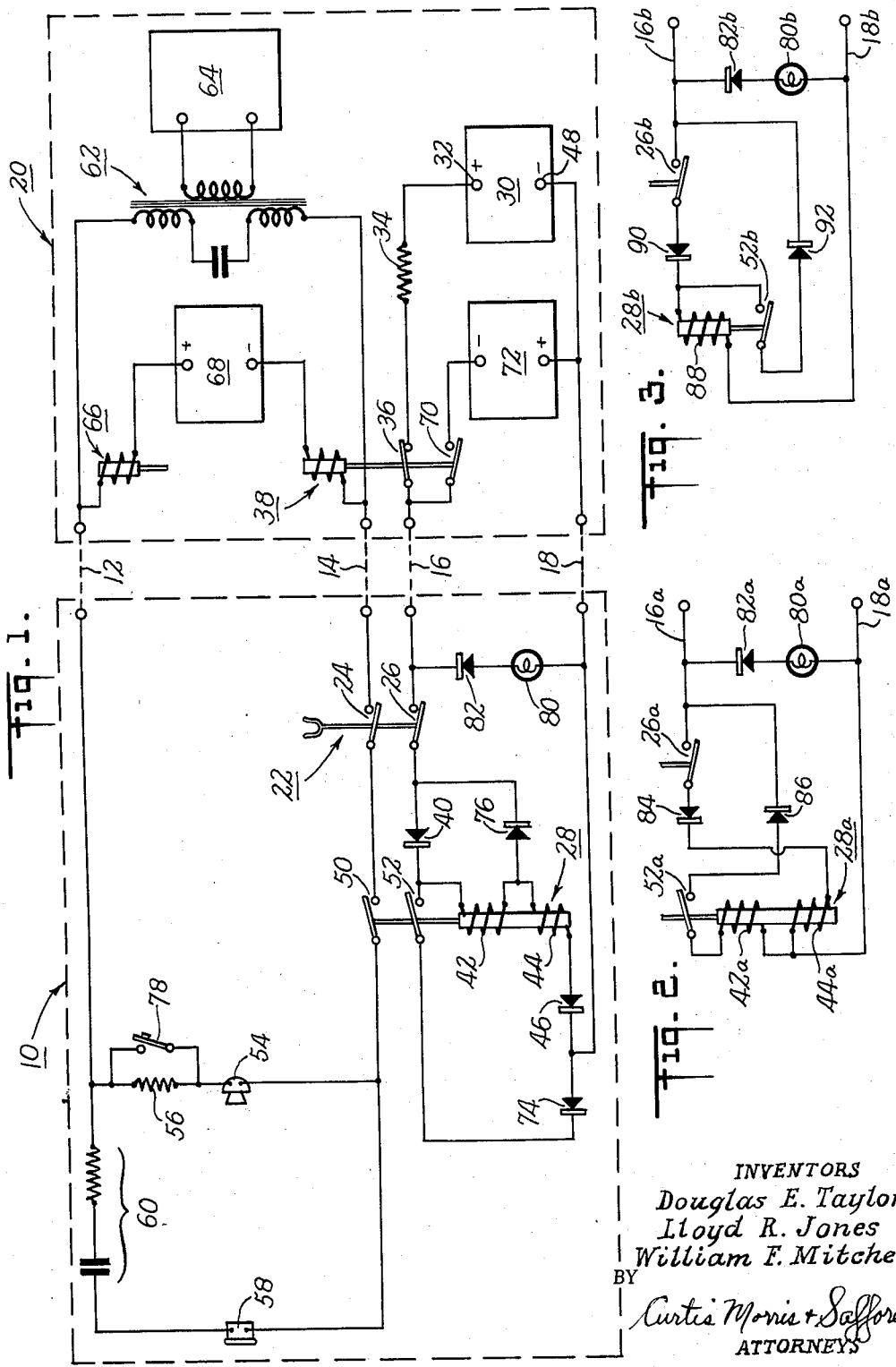

Patented Jan. 20, 1959

2,870,264

CONTROL APPARATUS FOR REMOTE DICTATION SYSTEMS

Douglas E. Taylor, Westport, Lloyd R. Jones, Stepney Depot, and William F. Mitchell, Fairfield, Conn., assignors to Dictaphone Corporation, Bridgeport, Conn., a corporation of New York Application September 26, 1957, Serial No. 686,467

11 Claims. (Cl. 179—100.1)

This invention relates to remotely-controlled dictating apparatus. More particularly, this invention relates to apparatus including a number of telephone-type instruments each forming a dictating station connectible to a central recording machine, and wherein means are provided for assuring that any station connected to the machine will have an exclusive channel so that the dictator cannot be interrupted by operation of any of the other instruments. The description herein is directed primarily to improvements over the system disclosed in U. S. patent application Serial No. 649,066, filed on March 28, 1957, by Lloyd R. Jones et al. For detailed information on parts of the system not specifically disclosed herein, reference is made to the above application.

Although apparatus for assuring each dictator an exclusive channel to the recording machine has been provided heretofore, these prior arrangements have had certain limitations. For example, it has been proposed to employ at each dictating station a "privacy relay" which when energized connects the respective instrument to the dictating machine, and to energize only one of these relays at a time by means of the direct current normally flowing through the talking circuit leading to the dictating machine. However, it is difficult to adapt such a privacy arrangement to a dictation system of the type wherein machine control signals are transmitted over the talking circuit, e. g. by varying the magnitude of the direct current flowing through the talking circuit. It also has been proposed to provide respective privacy relays at each of the dictating stations, and to transmit from the dictating machine control apparatus a relay energizing signal that energizes all of the privacy relays except the relay associated with the operated dictating station. For various reasons, however, such an arrangement has not been entirely satisfactory, e. g. a substantial amount of electrical power is required to energize the relatively large number of privacy relays frequently involved.

Accordingly, it is an object of the present invention to provide a remote dictation system having a privacy arrangement that is superior to those provided heretofore. It is a further object of the present invention to provide such a system wherein only one privacy relay is energized at a time, and which is adapted for use with systems wherein control signals are transmitted through the talking circuit to the dictating machine. It is a still further object of the present invention to provide a remote dictation system having a privacy arrangement that is economical to manufacture and reliable in operation. Other objects, advantages and aspects of the present invention will be in part pointed out in, and in part apparent from, the following description considered together with the accompanying drawings in which:

Figure 1 is a schematic diagram of a remote dictation system comprising a preferred embodiment of this invention;

Figure 2 is a fragmentary schematic diagram based on Figure 1 and showing a modified privacy arrangement; and Figure 3 is a fragmentary schematic diagram based on Figure 1 and showing a still further modified privacy arrangement.

Referring now to Figure 1, there is generally indicated at 10 a telephone-type dictator's instrument which is similar in many respects to the corresponding instrument disclosed in the above-identified application. However, for the sake of clarity the showing herein omits certain of the control signal apparatus shown in that prior application that is not necessary to an understanding of the present invention.

This instrument 10 is connected by a cable having four lines 12, 14, 16 and 18 leading to a dictating machine control unit generally indicated at 20. This unit is in most respects similar to the control apparatus disclosed in the above application, and therefore a number of the details previously disclosed have been omitted herein to simplify the description. It will be understood, of course, that a number of dictator's instruments 10 will be connected to the four-line cable, so that any one of several dictators may operate the dictating machine as desired.

The dictator's instrument 10 includes a cradle switch generally indicated at 22 and having a pair of normally-open contacts 24 and 26. When a dictator desires to dictate, he lifts the telephone handset out of its cradle and the contacts 24 and 26 close to complete the circuits described hereinbelow.

Closure of the lower cradle-switch contact 26 completes an energizing circuit for a privacy relay generally indicated at 28, the current coming from a D. C. power supply indicated in block form at 30 in the control unit 20. The energizing current path may be traced from the positive terminal 32 of this power supply through an isolation resistor 34 and contacts 36 of a line relay generally indicated at 38, through line 16 and cradle-switch contacts 26, through a rectifier 40, through both windings 42 and 44 of the privacy relay 28, through a rectifier 46 and along line 18 back to the negative terminal 48 of the power supply.

When the privacy relay 28 is thus energized, its contacts 50 and 52 close. Closure of the upper contacts 50 connects the talking circuit lines 12 and 14 to a microphone 54 in series with a current-limiting resistor 56, and to an earphone 58 in series with an R-C circuit 60. Accordingly, the dictator is enabled to transmit and receive voice signals through a balanced audio transformer 62 which is coupled to a conventional dictating machine generally indicated at 64.

Completion of this talking circuit through the microphone 54 also causes a flow of direct current through the line relay 38 and a second line relay 66, the current being supplied by a D.-C. power supply generally indicated at 68. The line relay 38 accordingly is energized, and its contacts 36 open a short interval after its contacts 70 close, i. e. a "make-before-break" arrangement. (The contacts 36 and 70 may, of course, be operated by additional relay means controlled by the line relay 38 if desired.) Closure of contacts 70 connects another D.-C. power supply 72 across the lines 16 and 18, this power supply however being connected in a reverse polarity sense relative to the power supply 30. The resistor 34 limits the flow of current between these two power supplies during the short interval that the contacts 36 and 70 are closed together.

With the reversal of polarity at the lines 16 and 18, the privacy relay 28 is held in by current flowing through a second energizing path which may be traced from the lower line 18 through a rectifier 74, through privacy relay contacts 52 and the upper relay winding 42, through a rectifier 76 and back through the cradle-switch contacts 26 to the line 16. Accordingly, the privacy relay contacts 50 remain closed and the dictator still is enabled to transmit and receive sound signals through the talking circuit lines 12 and 14 coupled to the dictating machine 64. It may be noted that in this Figure 1 arrangement, the privacy relay is energized by current flowing through two relay windings, but that current flow through only one of these windings is sufficient to hold the relay in once it has been actuated.

Once a dictator has seized control of the dictating machine as described above, the privacy relays at the other dictator's instruments (not shown) cannot be energized and hence the first dictator will have an exclusive channel to the dictating machine. The other privacy relays cannot be energized because, when a subsequent dictator lifts his hand-set out of its cradle, there is no path for the "reverse-polarity" signal on lines 16 and 18 to produce a flow of current through the privacy relay windings in the other instrument.

With the privacy relay 28 energized by the lines 16 and 18, the talking circuit lines 12 and 14 are available for the transmission of machine control signals. For example, to control the dictating machine clutch, a switch 78 is provided to short out the resistor 56 in series with the microphone 54. Closure of this switch increases the direct current flowing through the talking circuit to a level sufficient to actuate the second line relay 66, and this relay is provided with contacts (not shown) which control the clutch operation in a conventional manner. It will be apparent that similar control signals can be transmitted through other paired combinations of the lines 12 through 18, with the exception of the privacy relay energizing lines 16 and 18, without disturbing the operation of the privacy relay.

When the polarity is reversed on lines 16 and 18, current also flows from line 18 through an indicator lamp 80 and a rectifier 82 back to line 16, so that all dictating stations will be provided with a visual indication that the system is in use.

Figure 2 shows a modified arrangement having advantages for certain applications. In this arrangement, which is identical to Figure 1 except for the changes shown in Figure 2, the privacy relay 28a is first energized through a path which can be traced from line 16a through cradle-switch contacts 26a, through a rectifier 84 and through the lower relay winding 44a back to the line 18a. When the polarity across lines 16a and 18a is subsequently reversed by operation of the line relay 38 (Figure 1), the privacy relay is maintained actuated through a path which can be traced from the lower line 18a through the upper relay winding 42a, through the relay contacts 52a, through a rectifier 86 and back to the line 16a. In this arrangement, which is somewhat simpler than the Figure 1 embodiment, only one of the relay windings 42a and 44a is energized at a time; however, the flux in the relay core is in the same direction regardless of which of the windings is energized so that there is no reversal of the flux direction when the polarity changes across lines 16a and 18a.

Figure 3 represents a still simpler arrangement wherein the privacy relay 28b includes only one energizing winding 88. In this arrangement, the initial current path for the relay is from line 16b through the cradle-switch contacts 26b, through a rectifier 90 and the relay winding 88 back to the lower line 18b. After the polarity across lines 16b and 18b reverses, the relay is energized from line 18b through the relay winding 88, through the relay contacts 52b, and back through a rectifier 92 to the upper line 16a. Since in this case the current through the relay winding reverses direction when the polarity changes, the relay should be of the A.-C. type which is arranged to hold in actuated condition during a reversal of flux in the relay core.

Although several preferred embodiments of the invention have been set forth in detail, it is desired to emphasize that these are not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. In a remotely-operated dictation system of the type which includes centrally-located recording and control apparatus wherein a recording head is arranged for relative travelling movement with respect to a moving record, apparatus comprising, in combination, a plurality of remote dictator's instruments each including a transducer, a communication circuit for connecting said transducers to said recording and control apparatus, control means for each of said instruments and adapted when actuated to connect the respective transducer to said communication circuit, power supply means adapted to produce first and second outputs of different character, said power supply means being arranged normally to produce said first output when said dictation system is not in use, a control circuit for each of said instruments and adapted to connect said power supply means to the respective control means, said control circuit having first and second circuit conditions and normally being in said first condition when the respective instrument is not in use, on-off switch means for each of said instruments and arranged when placed in "on" position to connect said control circuit to said power supply means, said control circuit being arranged when in said first condition to actuate said control means when said power supply means produces a signal of said first character but not to actuate said control means when a signal of said second character is produced, operating means responsive to the completion of said communication circuit to one of said transducers and arranged to change said power supply output from said first character to said second character, and means responsive to the actuation of said control means for changing said control circuit from said first condition to said second condition, said control circuit being arranged when in said second condition to maintain said control means actuated by said second output of said power supply means.

2. In a remotely-operated dictation system of the type which includes centrally-located recording and control apparatus wherein a recording head is arranged for relative travelling movement with respect to a moving record, apparatus comprising, in combination, a plurality of remote dictator's instruments each including a transducer, a communication circuit for connecting said transducers to said recording and control apparatus, a privacy relay for each of said instruments and adapted when actuated to connect the respective transducer to said communication circuit, D.-C. power supply means adapted to produce first and second outputs of different predetermined polarities, said power supply means being arranged normally to produce said first output when said dictation system is not in use, a control circuit for each of said instruments and adapted to connect said power supply means to the respective control means, said control circuit having first and second circuit conditions and normally being in said first condition when the respective instrument is not in use, on-off switch means for each of said instruments and arranged when placed in "on" position to complete said control circuit to said power supply means, said control circuit being arranged when in said first condition to actuate said control means when said power supply means produces said first output of a predetermined polarity but not to actuate said control means when said second output of reverse polarity is produced, operating means responsive to the completion of said communication circuit to one of said transducers and arranged to change the polarity of said power supply means output, and means responsive to the actuation of said control means for changing said control circuit from said first condition to said second condition, said control circuit being arranged when in said second condition to maintain said control means actuated by said second output of reverse polarity produced by said power supply means.

3. In a remotely-operated dictation system of the type which includes centrally-located recording and control apparatus wherein a recording head is arranged for relative travelling movement with respect to a moving record, apparatus comprising, in combination, a plurality of remote dictator's instruments each including a transducer, a communication circuit for connecting said transducers to said recording and control apparatus, control means for each of said instruments and adapted when actuated to connect the respective transducer to said communication circuit, power supply means adapted to produce first and second outputs of different character, said power supply means being arranged normally to produce said first output when said dictation system is not in use, a control circuit for each of said instruments and adapted to connect said power supply means to the respective control means, said control circuit having first and second circuit conditions and normally being in said first condition when the respective instrument is not in use, on-off switch means for each of said instruments and arranged when placed in "on" position to connect said control circuit to said power supply means, said control circuit being arranged when in said first condition to actuate said control means when said power supply means produces a signal of said first character but not to actuate said control means when a signal of said second character is produced, a D.-C. power supply connected to said communication circuit to produce a flow of current therein when said control means is actuated to complete a connection between said communication circuit and one of said transducers, a line relay in said communication circuit energizable by said flow of current and operable to change said power supply output from said first character to said second character, and means responsive to the actuation of said control means for changing said control circuit from said first condition to said second condition, said control circuit being arranged when in said second condition to maintain said control means actuated by said second output of said power supply means.

4. In a remotely-operated dictation system of the type which includes centrally-located recording and control apparatus wherein a recording head is arranged for relative travelling movement with respect to a moving record, apparatus comprising, in combination, a plurality of remote dictator's instruments each including a transducer, a communication circuit for connecting said transducers to said recording and control apparatus, a privacy relay for each of said instruments and adapted when actuated to connect the respective transducer to said communication circuit, D.-C. power supply means adapted to produce first and second outputs of different polarity, said power supply means being arranged normally to produce said first output of one polarity when said dictation system is not in use, a control circuit comprising first and second alternative energizing circuits for each of said instruments and adapted to connect said power supply means to the respective privacy relay, said control circuit normally being conditioned to establish said first energizing circuit when the respective instrument is not in use, on-off switch means for each of said instruments and arranged when placed in "on" position to connect said control circuit to said power supply means, said first energizing circuit being arranged to actuate said privacy relay when said power supply means produces said first output of one polarity but not to actuate said privacy when said second output of opposite polarity is produced, operating means responsive to the completion of said communication circuit to one of said transducers and arranged to change the polarity of said power supply means from said first output of one polarity to said second output of opposite polarity, and relay contact means responsive to the actuation of said privacy relay for activating said second energizing circuit, said second energizing circuit being arranged to maintain said privacy relay actuated by said second output of opposite polarity produced by said power supply means.

5. In a remotely-operated dictation system of the type which includes centrally-located recording and control apparatus wherein a recording head is arranged for relative travelling movement with respect to a moving record, apparatus comprising, in combination, a plurality of remote dictator's instruments each including a transducer, a communication circuit for connecting said transducers to said recording and control apparatus, control means for each of said instruments and adapted when actuated to connect the respective transducer to said communication circuit, power supply means adapted to produce first and second outputs of different character, said power supply means being arranged normally to produce said first output when said dictation system is not in use, a control circuit for each of said instruments and adapted to connect said power supply means to the respective control means, said control circuit having first and second circuit conditions and normally being in said first condition when the respective instrument is not in use, on-off switch means for each of said instruments and arranged when placed in "on" position to connect said control circuit to said power supply means, said control circuit being arranged when in said first condition to actuate said control means when said power supply means produces a signal of said first character but not to actuate said control means when a signal of said second character is produced, operating means responsive to the completion of said communication circuit to one of said transducers and arranged to change said power supply output from said first character to said second character, means responsive to the actuation of said control means for changing said control circuit from said first condition to said second condition, said control circuit being arranged when in said second condition to maintain said control means actuated by said second output of said power supply means, and signalling means at each instrument coupled to said power supply means, said signalling means including circuit means responsive only to said second output of said power supply means, whereby when said dictation system is in use the signalling means will be energized to warn subsequent dictators thereof.

6. In a remotely-operated dictation system of the type which includes centrally-located recording and control apparatus wherein a recording head is arranged for relative travelling movement with respect to a moving record, apparatus comprising, in combination, a plurality of remote dictator's instruments each including a transducer, a communication circuit for connecting said transducers to said recording and control apparatus, a privacy relay for each of said instruments and adapted when actuated to connect the respective transducer to said communication circuit, D.-C. power supply means adapted to produce alternatively two outputs of first and second polarities, said power supply means being arranged normally to produce an output of said first polarity when said dictation system is not in use, first and second energizing circuits for each of said instruments and adapted when activated to connect said power supply means to the respective privacy relay, said first and second energizing circuits being responsive respectively only to signals of said first and second polarity, on-off switch means for each of said instruments and arranged when placed in "on" position to activate said first energizing circuit so that said privacy relay is actuated by said power supply means, operating means responsive to the completion of said communication circuit and arranged to change the output of said power supply means from said first polarity to said second polarity, and means responsive to the actuation of said privacy relay for activating said second energizing circuit, whereby said privacy relay is maintained actuated by the output of said second polarity produced by said power supply means.

7. In a remotely-operated dictation system of the type which includes centrally-located recording and control apparatus wherein a recording head is arranged for relative travelling movement with respect to a moving record, apparatus comprising, in combination, a plurality of remote dictator's instruments each including a transducer, a communication circuit for connecting said transducers to said recording and control apparatus, privacy relay means for each of said instruments and adapted when actuated to connect the respective transducer to said communication circuit, said privacy relay means comprising a pair of energizing windings, first power supply means adapted to produce first and second outputs of different polarity, said first power supply means being arranged normally to produce said first output when said dictation system is not in use, a control circuit for each of said instruments and adapted to connect said first power supply means to the respective privacy relay means, said control circuit having first and second circuit conditions and normally being in said first condition when the respective instrument is not in use, on-off switch means for each of said instruments and arranged when placed in "on" position to connect said control circuit to said first power supply means, said control circuit being arranged when in said first condition to cause a flow of current through both windings of said privacy relay means when said first power supply means produces a signal of said first polarity but not to cause any current flow when a signal of said second polarity is produced, second power supply means connected to said communication circuit to produce a flow of current therein when said privacy relay means is actuated, a line relay in said communication circuit energizable by the current flow and operable to change said first power supply output from said first polarity to said second polarity, and means responsive to the actuation of said privacy relay means for changing said control circuit from said first condition to said second condition, said control circuit being arranged when in said second condition to maintain said privacy relay means actuated by the flow of current from said first power supply means output of said second polarity.

8. In a remotely-operated dictation system of the type which includes centrally-located recording and control apparatus wherein a recording head is arranged for relative travelling movement with respect to a moving record, apparatus comprising, in combination, a plurality of remote dictator's instruments each including a transducer, circuit means for connecting said instruments to said recording and control apparatus, said circuit means comprising first, second, third and fourth lines, said first and second lines serving as a communication circuit for said transducers and said third and fourth lines serving as a signal circuit, a privacy relay for each of said instruments and including first and second contacts arranged to close when the respective relay is actuated, said first privacy relay contacts being in series with said communication circuit, D. C. power supply means connected across said signal circuit and adapted to produce first and second outputs of different polarity alternately, said power supply means being arranged normally to produce an output of said first polarity when said dictation system is not in use, a first energizing circuit including at least one rectifier element and adapted to connect the respective privacy relay to said signal circuit, said one rectifier being poled to pass current when a signal of said first polarity is applied to said first energizing circuit, a second energizing circuit for connecting said privacy relay to said signal circuit and including another rectifier poled to pass current when a signal of said second polarity is applied to said second energizing circuit, said second privacy relay contacts being arranged when closed to complete said second energizing circuit, on-off switch means for each of said instruments and arranged when placed in "on" position to connect said first energizing circuit to said power supply means so that said privacy relay will be energized if said power supply means is conditioned to produce an output of said first polarity, said second privacy relay contacts thereby being closed to activate said second energizing circuit, and operating means responsive to the closure of said first privacy relay contacts in said communication circuit and arranged to change the output of said power supply means from said first polarity to said second polarity, whereby said privacy relay is maintained in actuated condition by current flow through said second energizing circuit.

9. In a remotely-operated dictation system of the type which includes centrally-located recording and control apparatus wherein a recording head is arranged for relative travelling movement with respect to a moving record, apparatus comprising, in combination, a plurality of remote dictator's instruments each including a transducer, circuit means for connecting said instruments to said recording and control apparatus, said circuit means comprising first, second, third and fourth lines, said first and second lines serving as a communication circuit for said transducers and said third and fourth lines serving as a signal circuit, a privacy relay for each of said instruments and having a pair of series-connected windings, said relay including first and second contacts arranged to close when the respective relay is actuated, said first privacy relay contacts being in series with said communication circuit, D.-C. power supply means connected across said signal circuit and adapted to produce first and second outputs of different polarity alternatively, said power supply means being arranged normally to produce an output of said first polarity when said dictation system is not in use, a first energizing circuit for connecting said relay to said signal circuit and including a first pair of rectifier elements connected in series with both of said relay windings, said first pair of rectifiers being poled to pass current when a signal of said first polarity is applied to said first energizing circuit, a second energizing circuit for connecting said privacy relay to said signal circuit and including a second pair of rectifiers connected in series with only one of said relay windings, said second pair of rectifiers being poled to pass current when a signal of said second polarity is applied to said second energizing circuit, said second privacy relay contacts connected in series with said second energizing circuit, on-off switch means for each of said instruments and arranged when placed in "on" position to connect said first energizing circuit to said power supply means so that the corresponding privacy relay will be energized if said power supply means is conditioned to produce an output of said first polarity, said second privacy relay contacts thereby being closed to activate said second energizing circuit, and operating means responsive to the closure of said first privacy relay contacts in said communication circuit and arranged to change the output of said power supply means from said first polarity to said second polarity, whereby said privacy relay is maintained in actuated condition by current flow through said second energizing circuit.

10. In a remotely-operated dictation system of the type which includes centrally-located recording and control apparatus wherein a recording head is arranged for relative travelling movement with respect to a moving record, apparatus comprising, in combination, a plurality of remote dictator's instruments each including a transducer, circuit means for connecting said instruments to said recording and control apparatus, said circuit means comprising first, second, third and fourth lines, said first and second lines serving as a communication circuit for said transducers and said third and fourth lines serving as a signal circuit, a privacy relay for each of said instruments and having a pair of windings, said relay including first and second contacts arranged to close when the relay is actuated, said first privacy relay contacts being in series with said communication circuit, D.-C. power supply means connected across said signal circuit and adapted to produce first and second outputs of different polarity alternatively, said power supply means being arranged normally to produce an output of said first polarity when said dictation system is not in use, a first energizing circuit for connecting said relay to said signal circuit and including a first rectifier element connected in series with one of said relay windings, said first rectifier being poled to pass current when a signal of said first polarity is applied to said first energizing circuit, a second energizing circuit for connecting said privacy relay to said signal circuit and including a second rectifier element connected in series with the other one of said relay windings, said second rectifier being poled to pass current when a signal of said second polarity is applied to said second energizing circuit, said second privacy relay contacts being arranged when closed to complete said second energizing circuit, on-off switch means for each of said instruments and arranged when placed in "on" position to connect said first energizing circuit to said power supply means so that said privacy relay will be energized if said power supply means is conditioned to produce an output of said first polarity, said second privacy relay contacts thereby being closed to activate said second energizing circuit, and operating means responsive to the closure of said first privacy relay contacts in said communication circuit and arranged to change the output of said power supply means from said first polarity to said second polarity, whereby said privacy relay is maintained in actuated condition by current flow through said second energizing circuit.

11. In a remotely-operated dictation system of the type which includes centrally-located recording and control apparatus wherein a recording head is arranged for relative travelling movement with respect to a moving record, apparatus comprising, in combination, a plurality of remote dictator's instruments each including a transducer, circuit means for connecting said instruments to said recording and control apparatus, said circuit means comprising first, second, third and fourth lines, said first and second lines serving as a communication circuit for said transducers and said third and fourth lines serving as a signal circuit, a single winding privacy relay for each of said instruments and including first and second contacts arranged to close when the respecitve relay is actuated, said first privacy relay contacts being in series with said communication circuit, D.-C. power supply means connected across said signal circuit and adapted to produce first and second outputs of different polarity alternatively, said power supply means being arranged normally to produce an output of said first polarity when said dictation system is not in use, a first energizing circuit for connecting said relay winding to said signal circuit and including a rectifier element connected in series with said winding, said rectifier being poled to pass current when a signal of said first polarity is applied to said first energizing circuit, a second energizing circuit for connecting said privacy relay to said signal circuit and including said second privacy relay contacts in series with said relay winding, on-off switch means for each of said instruments and arranged when placed in "on" position to connect said first energizing circuit to said power supply means so that said privacy relay will be energized if said power supply means is conditioned to produce an output of said first polarity, said second privacy relay contacts thereby being closed to activate said second energizing circuit, and operating means responsive to the closure of said first privacy relay contacts in said communication circuit and arranged to change the output of said power supply means from said first polarity to said second polarity, whereby said privacy relay is maintained in actuated condition by current flow through said second energizing circuit.

No references cited.